United States Patent
Ding et al.

(10) Patent No.: US 11,934,809 B2
(45) Date of Patent: Mar. 19, 2024

(54) MULTI-STAGE AUTOMATIC COMPILATION FOR VECTOR COMPUTATIONS IN APPLICATIONS

(71) Applicant: Intel Corporation, Santa Clara, CA (US)

(72) Inventors: Junyong Ding, Shanghai (CN); Mohammad Haghighat, San Jose, CA (US); Qi Zhang, Shanghai (CN); Sebastian Winkel, Los Altos, CA (US); Tianyou Li, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/053,531

(22) PCT Filed: Nov. 6, 2019

(86) PCT No.: PCT/CN2019/115865
§ 371 (c)(1),
(2) Date: Nov. 6, 2020

(87) PCT Pub. No.: WO2021/087791
PCT Pub. Date: May 14, 2021

(65) Prior Publication Data
US 2023/0102562 A1  Mar. 30, 2023

(51) Int. Cl.
*G06F 8/41* (2018.01)

(52) U.S. Cl.
CPC ..................... *G06F 8/41* (2013.01)

(58) Field of Classification Search
CPC ..... G06F 8/65; G06F 8/60; G06F 8/41; G06F 8/427; G06F 8/4441; G06F 8/443; G06F 8/4434
See application file for complete search history.

(56) References Cited

U.S. PATENT DOCUMENTS

| | | | |
|---|---|---|---|
| 11,048,502 B1 * | 6/2021 | Hogan | G06F 8/73 |
| 2012/0159444 A1 * | 6/2012 | Agarwal | G06F 11/3624 717/124 |

(Continued)

FOREIGN PATENT DOCUMENTS

| | | |
|---|---|---|
| CN | 104503819 A | 4/2015 |
| CN | 108153529 A | 12/2017 |
| CN | 110245468 A | 9/2019 |

OTHER PUBLICATIONS

Pascal Aubry et al., Extended Cyclostatic Dataflow Program Compilation and Execution for an Integrated Manycore Processor, Elsevier, 2013, pp. 1624-1633. Retrieved from the Internet: <URL: https://pdf.sciencedirectassets.com/280203/>. (Year: 2013).*

(Continued)

*Primary Examiner* — Hanh Thi-Minh Bui
(74) *Attorney, Agent, or Firm* — Jordan IP Law, LLC

(57) ABSTRACT

Systems, apparatuses and methods may provide for developer stage technology that embeds binary code into an application binary file, wherein the binary code corresponds to vector functions and non-vector functions in statically typed source code, and generates intermediate representation (IR) data, wherein the intermediate representation data corresponds to the vector functions in the statically typed source code. Additionally, the developer stage technology embeds the IR data in the application binary file. Moreover, deployment stage technology may generate a first compilation output based on the application binary file and detect a capability change in an execution environment associated with the first compilation output. The deployment stage technology may also generate, in response to the detected capability change, a second compilation output based on the first compilation output.

15 Claims, 8 Drawing Sheets

(56) References Cited

U.S. PATENT DOCUMENTS

2016/0196123 A1 7/2016 Fontenot et al.
2018/0260199 A1 9/2018 Cheng et al.

OTHER PUBLICATIONS

Intel Corporation, "Intel's 'One API' Project Delivers Unified Programming Model Across Diverse Architectures," <newsroom.intel.com/news/intels-one-api-project-delivers-unified-programming-model-across-diverse-architectures/#gs.k436hc>, Jun. 19, 2019, 4 pages.
International Search Report and Written Opinion for International Patent Application No. PCT/CN2019/115865, dated Aug. 5, 2020, 5 pages.
Wikipedia, "Bytecode", <en.wikipedia.org/wiki/Bytecode>, retrieved Oct. 22, 2019, 4 pages.
Wikipedia, "Intermediate representation", <en.wikipedia.org/wiki/Intermediate_representation>, retrieved Oct. 22, 2019, 3 pages.

\* cited by examiner

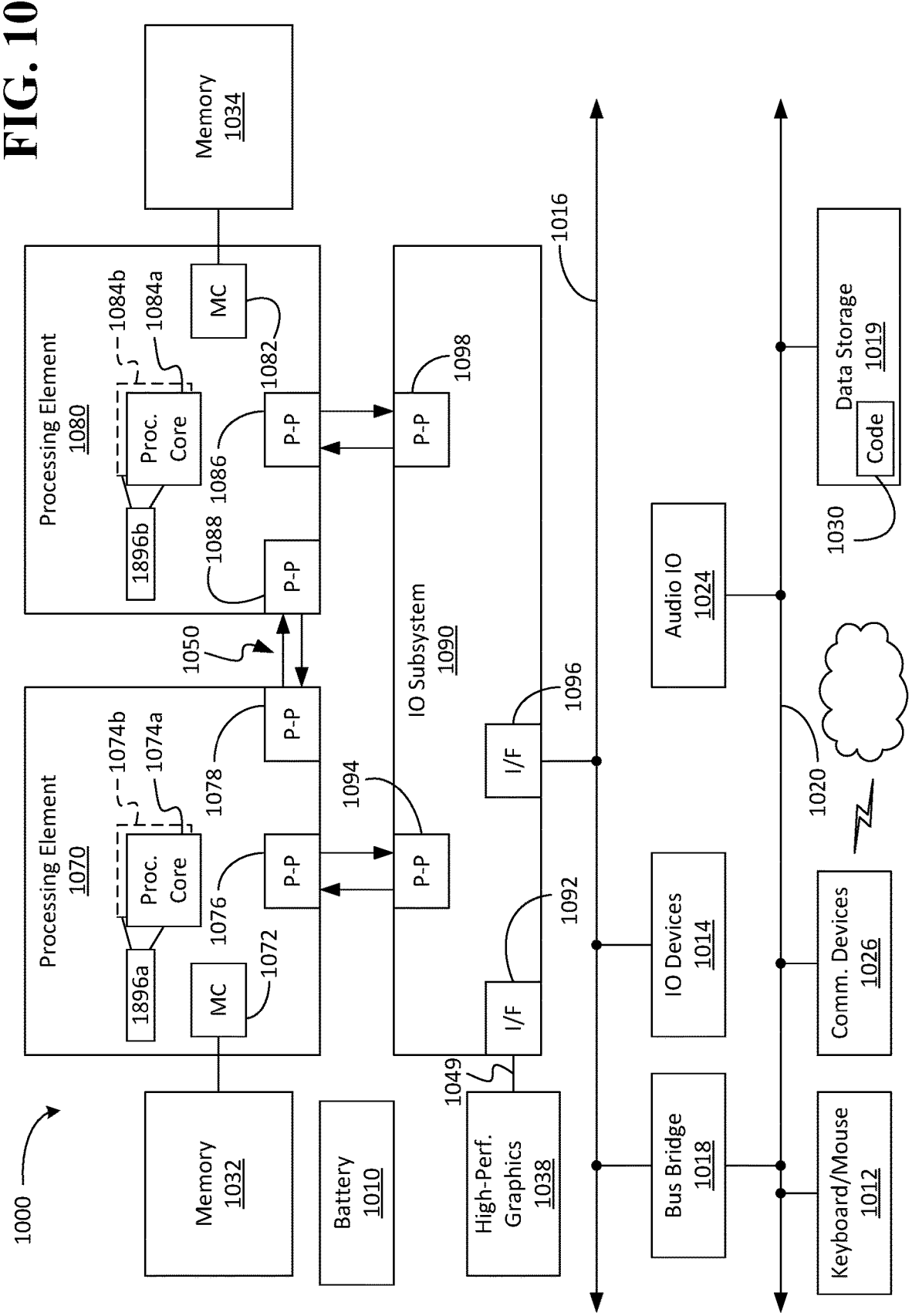

MULTI-STAGE AUTOMATIC COMPILATION FOR VECTOR COMPUTATIONS IN APPLICATIONS

CROSS REFERENCE TO RELATED APPLICATIONS

The present application is a U.S. National Phase Patent Application, which claims the benefit of priority to International Patent Application No. PCT/CN2019/115865 filed on Nov. 6, 2019.

TECHNICAL FIELD

Embodiments generally relate to software deployment. More particularly, embodiments relate to multi-stage automatic compilation for vector computations in deployed applications.

BACKGROUND

Software applications written in statically typed languages (e.g., C++, Rust) are typically compiled by the application developer prior to deployment on the end user computing system. The compilation may use code optimization techniques to convert the application from a high-level programming language to a low-level language (e.g., assembly language, object code, machine code) that is executable by the end user computing system. If subsequent upgrades (e.g., enhancement of instruction set architecture/ISA, addition of new hardware) are made in the end user computing system, unless the developer recompiles and redeploys the application, the application may fail to take advantage of the system upgrades. Accordingly, suboptimal operation of the deployed application may be experienced. Moreover, the recompilation and redeployment process may lead to slower enablement of new software features on the part of application developers and/or slower acceptance of system upgrades on the part of end users.

BRIEF DESCRIPTION OF THE DRAWINGS

The various advantages of the embodiments will become apparent to one skilled in the art by reading the following specification and appended claims, and by referencing the following drawings, in which:

FIG. 10 is a block diagram of an example of a multi-processor based computing system according to an embodiment.

DESCRIPTION OF EMBODIMENTS

Figure 1:
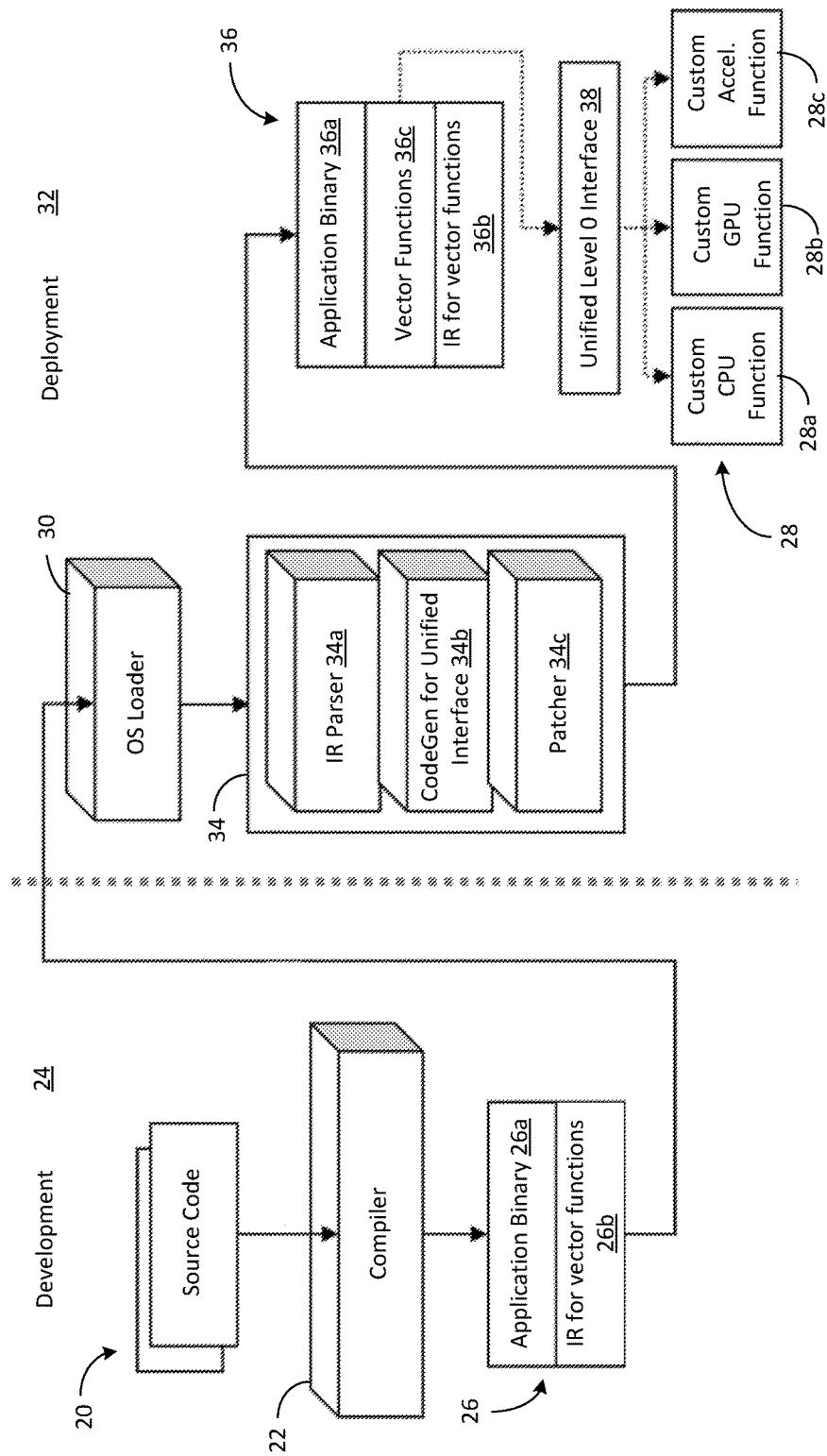
FIG. 1 is a process flow diagram of an example of an application development and deployment according to an embodiment.

Turning now to FIG. 1, an application deployment is shown in which source code 20 is input to a first compiler 22 (e.g., including a link editor or linker) during a development stage 24. The first compiler 22 may generally use code optimization techniques to convert the source code 20 into an application binary file 26 (26a, 26b, e.g., compilation output) that is executable by a set of hardware devices in an execution environment. In one example, the code optimization techniques take into consideration information regarding the hardware devices (e.g., ISA, device types) at the time of compilation. In an embodiment, the source code 20 is written in a statically typed language such as, for example, C++, Rust. Accordingly, the types of variables used by the source code 20 to retrieve data, perform operations, output data, etc., may be known at compile time. Thus, the code optimization techniques used by the illustrated first compiler 22 may also take into consideration the variable type information when generating the application binary file 26.

Portions of the source code 20 may perform vector computations that are relatively self-contained and have little dependency on other portions of the source code. For example, kernel functions, loop functions, single instruction multiple data (SIMD) functions, multi-processor (e.g., OpenMP/Open Multi-Processing) directive functions, multi-processor pragma functions, etc., may be examples of vector functions and/or operations performed by the source code 20. Such functions may be particularly useful when performing matrix operations, multi-tenant operations, and other operations of a parallel nature (e.g., graphics color functions). In the illustrated example, the application binary file 26 includes a first section containing binary code 26a corresponding to vector functions and non-vector functions in the source code 20 and a second section containing intermediate representation (IR) data 26b (e.g., bytecode, portable code and/or p-code data) corresponding to vector functions in the source code 20. In an embodiment, the IR data 26b includes standalone vector-related intermediate representations and/or vector-related intermediate representations generated by the first compiler 22 during conversion of the source code 20 into the application binary file 26. The IR data 26b may also include neural network tensor data (e.g., tensors and corresponding operators in the TENSORFLOW or PYTORCH tensor related frameworks).

In the illustrated example, the application binary file 26 is input to an operating system (OS) loader 30 during a deployment stage 32. In an embodiment, a second compiler 34 (34a-34c) generates a compilation output 36 (36a-36c) based on the application binary file 26. The compilation output 36 may include the binary code 36a corresponding to the vector functions and the non-vector functions in the source code 20, the IR data 36b corresponding to the vector functions in the source code 20, and vector function mappings 36c to a unified level 0 interface 38.

In an embodiment, the unified level 0 interface 38 operates in compliance with unified programming model such as, for example, ONEAPI, which may be used to program a heterogeneous set of custom (e.g., specialized) functions 28 (28a-28c) for a broad range of processor types including CPUs (central processing units), GPUs (graphics processing units), FPGAs (field programmable gate arrays), and special-purpose accelerators (e.g., MOVIDIUS VPU). Thus, the unified level 0 interface 38 might define, at execution time, a custom CPU function 28a for a first vector function (e.g., kernel function), a custom GPU function 28b for a second vector function (e.g., SIMD function), a custom accelerator function 28c for a third vector function (e.g., loop function), and so forth. The illustrated solution therefore enables more efficient execution of the compilation output 36 on a heterogeneous set of hardware devices.

As will be discussed in greater detail, the second compiler 34 may regenerate the compilation output 36 after deployment in response to capability changes such as subsequent upgrades (e.g., enhancement of the ISA, addition of new hardware) being made in the end user computing system. Such an approach further enhances performance by enabling the compilation output 36 to take advantage of the subsequent upgrades. Indeed, eliminating the recompilation and redeployment process on the part of the application developer may lead to faster enablement of new software features by application developers and/or faster acceptance/adoption of system upgrades on the part of end users.

Figure 2:
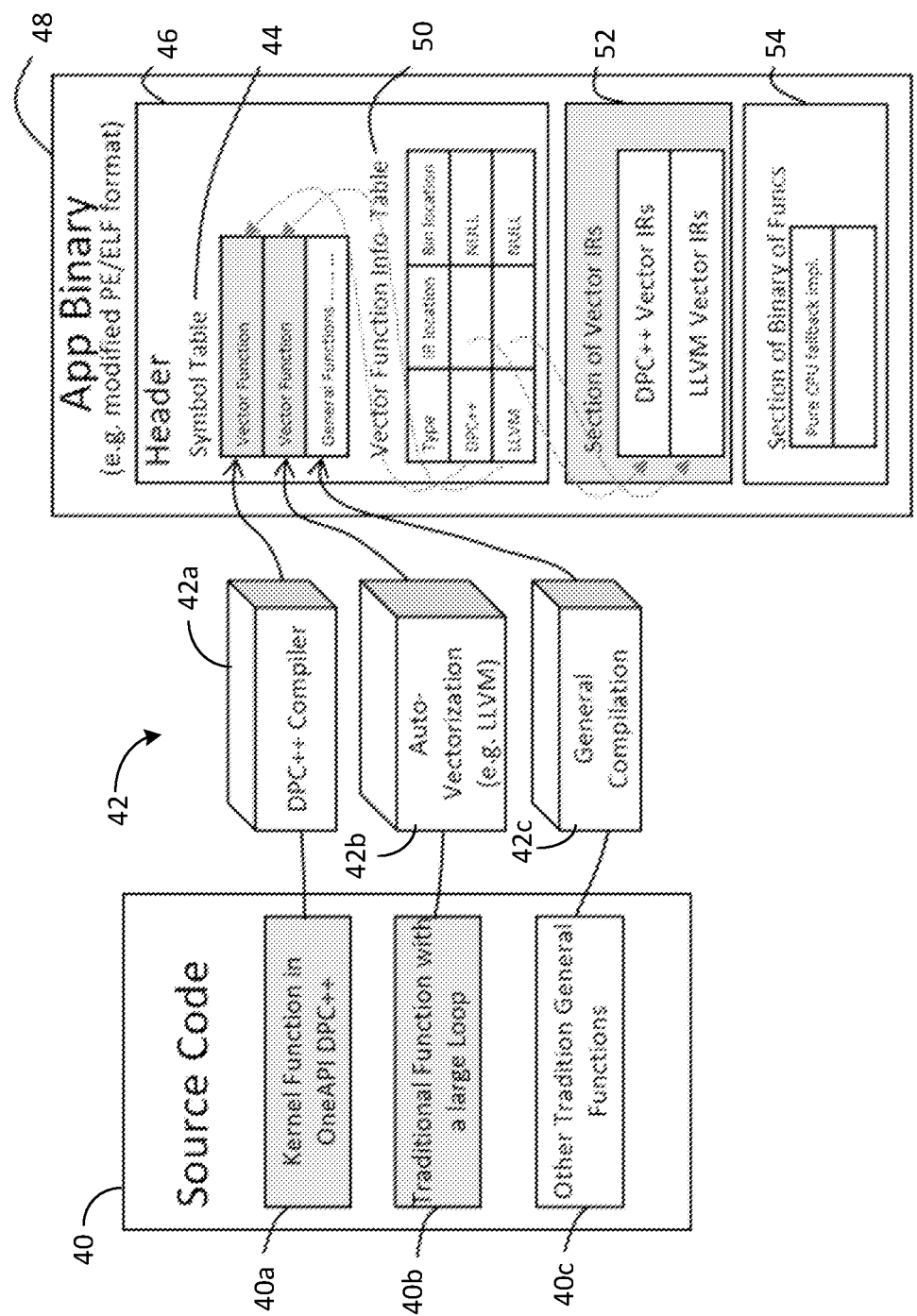
FIG. 2 is a block diagram of an example of a development stage compilation according to an embodiment.

FIG. 2 shows a development stage compilation in which source code 40 (40a-40c) includes a kernel function 40a (e.g., defined in Data Parallel C++/DPC++ via the ONEAPI stack), a traditional function 40b with a relatively large loop that is automatically vectorized by, for example, LLVM (e.g., clang compiler), and other traditional general functions 40c (e.g., non-vector functions). In the illustrated example, a compiler 42 (42a-42c) uses a DPC++ compilation component 42a to generate a first vector function entry in a symbol table 44 of a header 46 in an application ("app") binary file 48 based on the kernel function 40a. Additionally, an auto-vectorization component 42b may generate a second vector function entry in the symbol table 44 based on the traditional function 40b.

In an embodiment, corresponding entries may also be made in a vector function information table 50, which uses an IR location field (e.g., indicating start position and size) to map to a section 52 of vector IRs embedded in the application binary file 48. The vector function information table 50 and the section 52 may be generated by the compiler 42, merged by a linker, and embedded as data sections in the application binary file 48 to facilitate compatibility (e.g., PE/Portable Executable for WINDOWS, ELF/Executable and Linkable Format for LINUX, or other suitable format). Moreover, the compilation toolchain may generate default implementations to ensure that the application binary file 48 executes properly even if a subsequent compilation is not performed.

The vector function information table 50 may also include a binary ("Bin") location field (e.g., indicating start position and size), which contains null data for the entries at the development stage. In the illustrated example, a general compilation component 42c generates one or more general function entries in the symbol table 44 based on the other traditional general functions 40c. Additionally, a section 54 of binary functions may be embedded in the application binary file 48 (e.g., as fallback code for pure CPU implementations).

Figure 3:
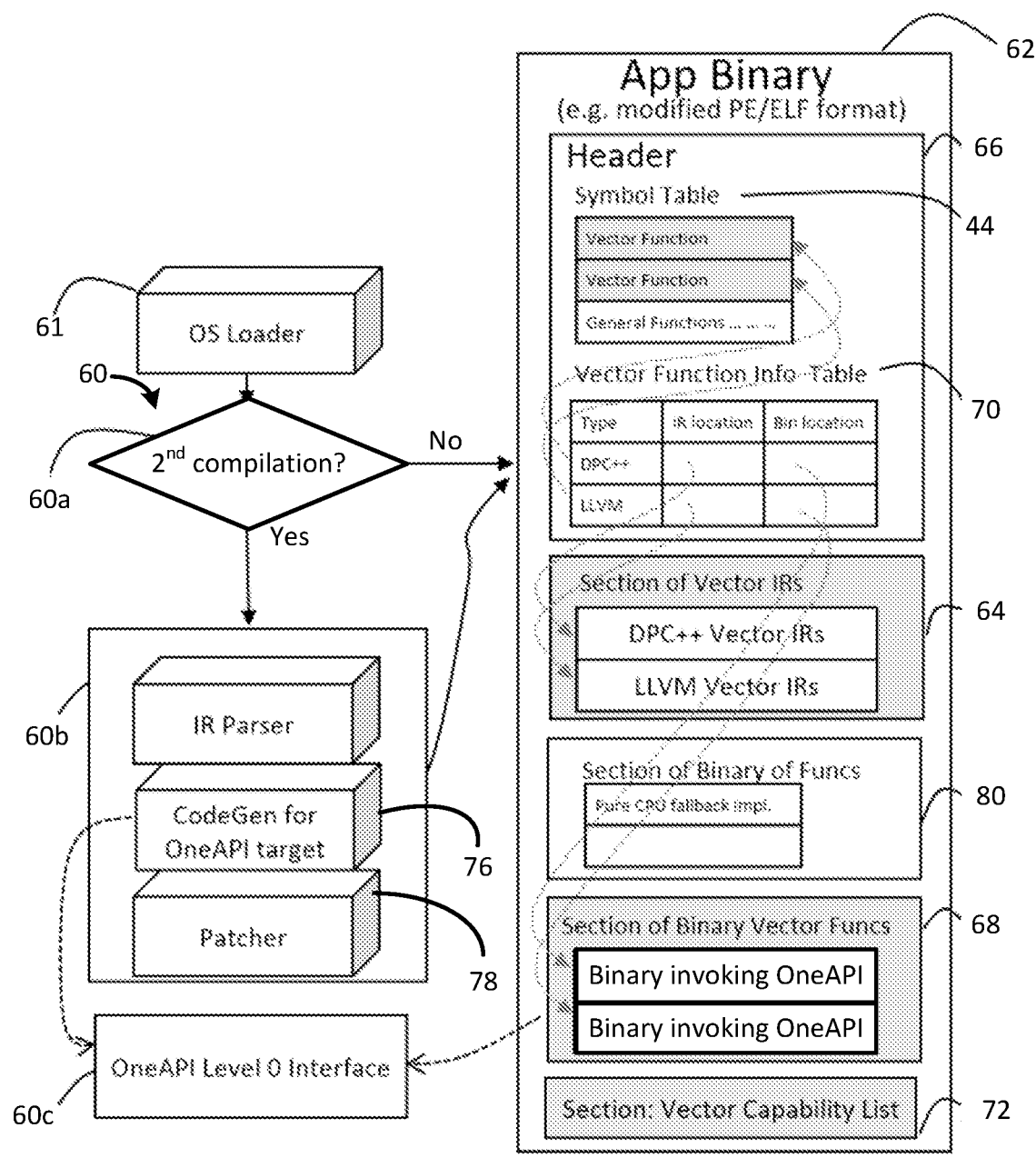
FIG. 3 is a block diagram of an example of one or more deployment stage compilations according to an embodiment.

Turning now to FIG. 3, a deployment stage compilation is shown in which a compiler 60 (60a-60c) uses an enhanced OS loader 61 to determine whether an application binary file 62 contains a vector function information table 70 in a header 66 of the file 62. If so, a state analyzer 60a determines whether a subsequent (e.g., $2^{nd}$, $3^{rd}$, etc.) compilation is to be conducted. The state analyzer 60a may therefore determine whether a subsequent compilation has never before been triggered for the application binary file 62 and/or whether the vector computation capabilities of the execution environment have changed since the last compilation.

To determine whether the vector computation capabilities have changed, the state analyzer 60a may make a recording (e.g., "snapshot") of all hardware and software runtime details related to vector computations every time a subsequent compilation is performed. In an embodiment, the snapshot contains information about CPU AVX (Advanced Vector Extension) width and/or version, accelerator (GPU, video processing unit/VPU, etc.) details, ONEAPI stack versions, etc. The snapshot may be stored in a section in the application binary file 62 containing a vector capability list 72. In one example, the OS loader 61 captures the same information of the current execution environment as the information in the vector capability list 72 to determine whether there are enough changes to trigger a new compilation. To accelerate the capture of execution environment information, there may be other optimizations that cache the snapshot and update the snapshot in accordance with a certain cadence or in response to certain events.

If a subsequent compilation is not to be conducted, the illustrated application binary file 62 is executed in the current state of the file 62. Otherwise, for each entry in the vector function information table 70, a compiler 60b will find the corresponding IR in a section 64 of vector IR data. Based on the type of IR, a corresponding parser 74 in the compiler 60b is invoked. Additionally, a code generation ("CodeGen") component 76 in the compiler 60b maps the parsed result to a ONEAPI level 0 interface 60c. According to the actual hardware components and software runtime of the deployed system, the ONEAPI level 0 interface may generate specialized binaries for the vector functions.

A patcher 78 in the compiler 60b integrates the specialized functions back into application binary file 62 by organizing the generated binaries into a section 68 of binary vector functions (e.g., each invoking ONEAPI), patch the vector function information table 70 with binary locations, and patch the related tables of the PE/ELF data structure to ensure that the functions are integrated with and invokable by rest of the general code (e.g., create related stubs, patch relocation tables, etc.). If the procedure succeeds, the illustrated patcher 78 updates the vector capability list 72 with captured vector computation capabilities of the current execution environment. Otherwise, the patcher 78 uses a section 80 of fallback binary code instead. Operation control may then be returned to the OS loader 61, which loads and executes the updated application binary 62.

Accordingly, application developers only compile the application binary once, with the remaining compilations being conducted automatically after deployment. The automatic subsequent stage compilations automatically adapts to up-to-date hardware and software capabilities with the assistance of a unified programming model such as the ONEAPI level 0 interface.

Figure 4:
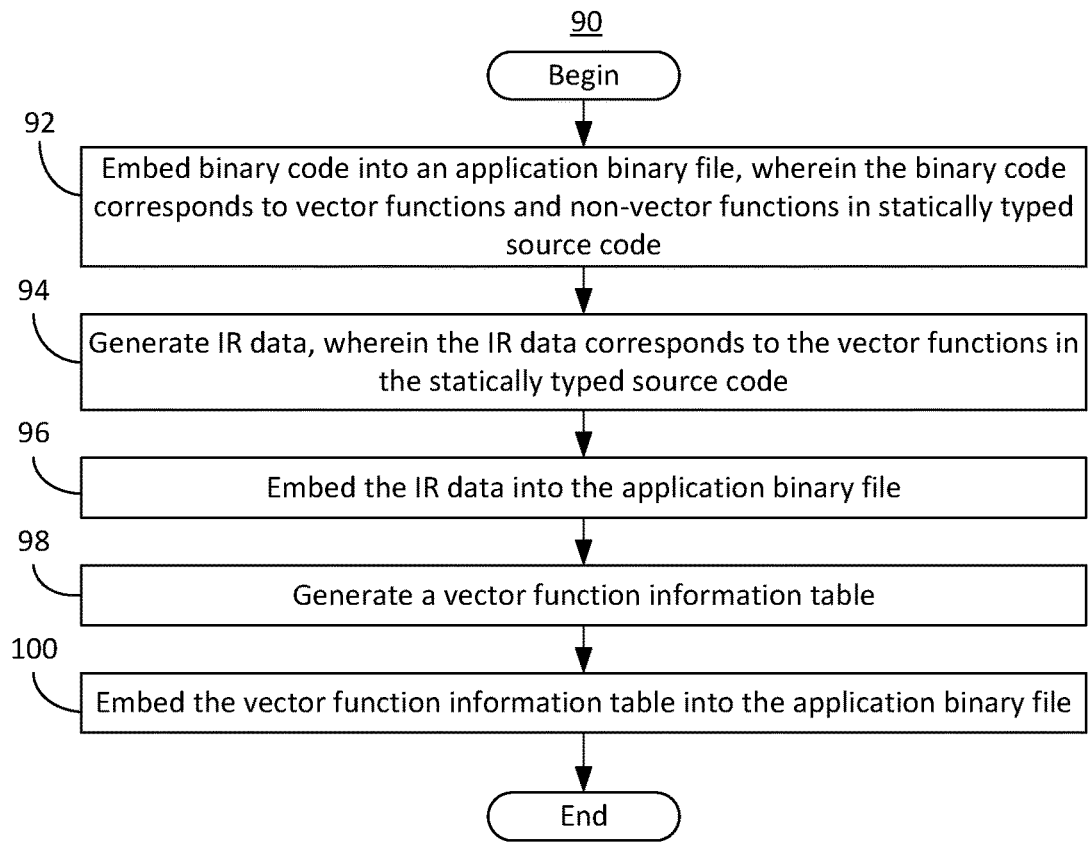
FIG. 4 is a flowchart of an example of a method of conducting an initial compilation of source code according to an embodiment.

FIG. 4 shows a method 90 of conducting an initial compilation of source code. The method 90 may generally be implemented in a compiler such as, for example, the compiler 22 (FIG. 1) and/or the compiler 42 (FIG. 2), already discussed. More particularly, the method 90 may be implemented as one or more modules in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), FPGAs, complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 90 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, ISA instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 92 provides for embedding binary code into an application binary file, wherein the binary code corresponds to vector functions and non-vector functions in statically typed source code. Block 94 generates IR data, wherein the IR data corresponds to the vector functions in the statically typed code. In an embodiment, the vector functions include kernel functions, loop functions, SIMD functions, multi-processor directive functions, multi-processor pragma functions, etc., or any combination thereof. Additionally, the IR data may include compiler IRs, neural network tensor data, and so forth.

The IR data may be embedded into the application binary file at block 96, wherein block 98 generates a vector function information table. In on example, the vector function information table includes a type field, an IR location field, and a binary location field. Moreover, the binary location field may include null data for one or more entries in the vector function information table. Illustrated block 100 embeds the vector function information table into the application binary file. Although the illustrated method 90 focuses on statically typed source code, the source code may also be dynamically typed source code having variable type data that is known only at runtime. In yet another example, the source code may be statically typed code that is associated with dynamically typed source code (e.g., garbage collection code of a managed runtime application).

The illustrated method 90 enhances performance by enabling the application binary file to take advantage of subsequent upgrades to the execution environment. Indeed, eliminating the recompilation and redeployment process on the part of the application developer may lead to faster enablement of new software features by application developers and/or faster acceptance of system upgrades on the part of end users.

Figure 5:
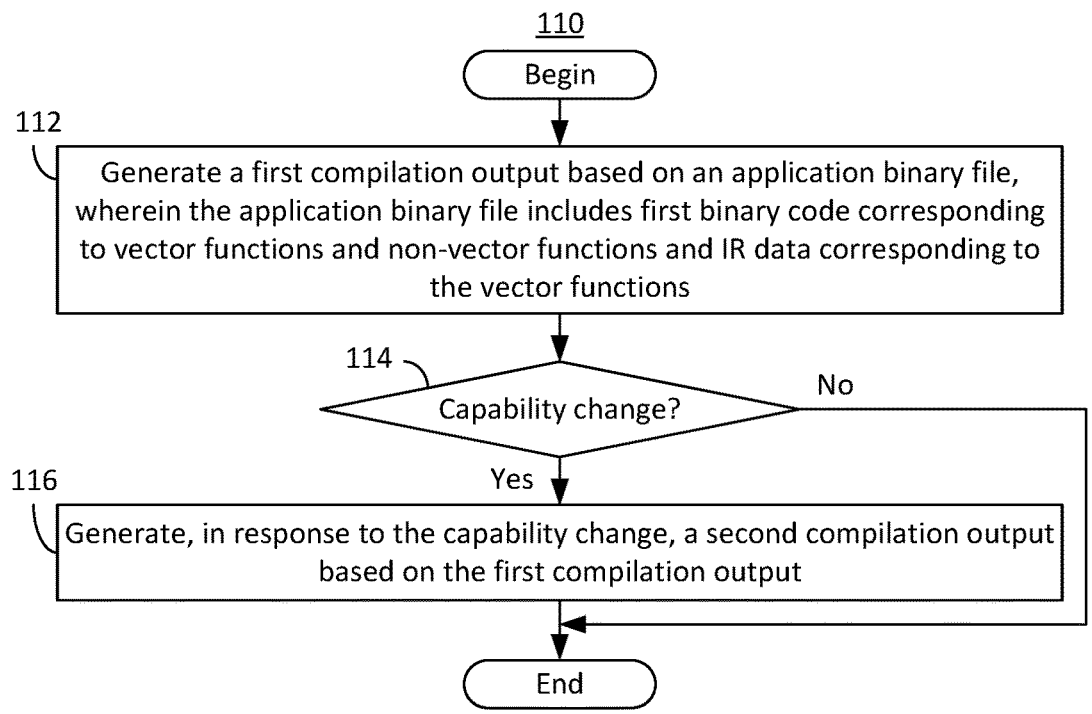
FIG. 5 is a flowchart of an example of a method of conducting one or more subsequent compilations of source code according to an embodiment.

FIG. 5 shows a method 110 of conducting one or more subsequent compilations of source code. The method 110 may generally be implemented in a compiler such as, for example, the compiler 34 (FIG. 1) and/or the compiler 60 (FIG. 3), already discussed. More particularly, the method 110 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 112 provides for generating a first compilation output based on an application binary file, wherein the application binary file includes first binary code corresponding to vector functions and non-vector functions and IR data corresponding to the vector functions (e.g., kernel functions, loop functions, SIMD functions, multi-processor directive functions, multi-processor pragma functions, etc.). A determination may be automatically made at block 114 as to whether a capability change has been detected in an execution environment associated with the first compilation output. In an embodiment, the capability change is a hardware change (e.g., addition of new accelerator), a software change (wider instructions in the ISA, new driver), etc., or any combination thereof. If a capability change is detected, block 116 generates, in response to the capability change, a second compilation output based on the first compilation output.

The illustrated method 110 enhances performance by enabling the compilation output to take advantage of subsequent upgrades to the execution environment. Indeed, eliminating the recompilation and redeployment process on the part of the application developer may lead to faster enablement of new software features by application developers and/or faster acceptance of system upgrades on the part of end users.

Figure 6A:
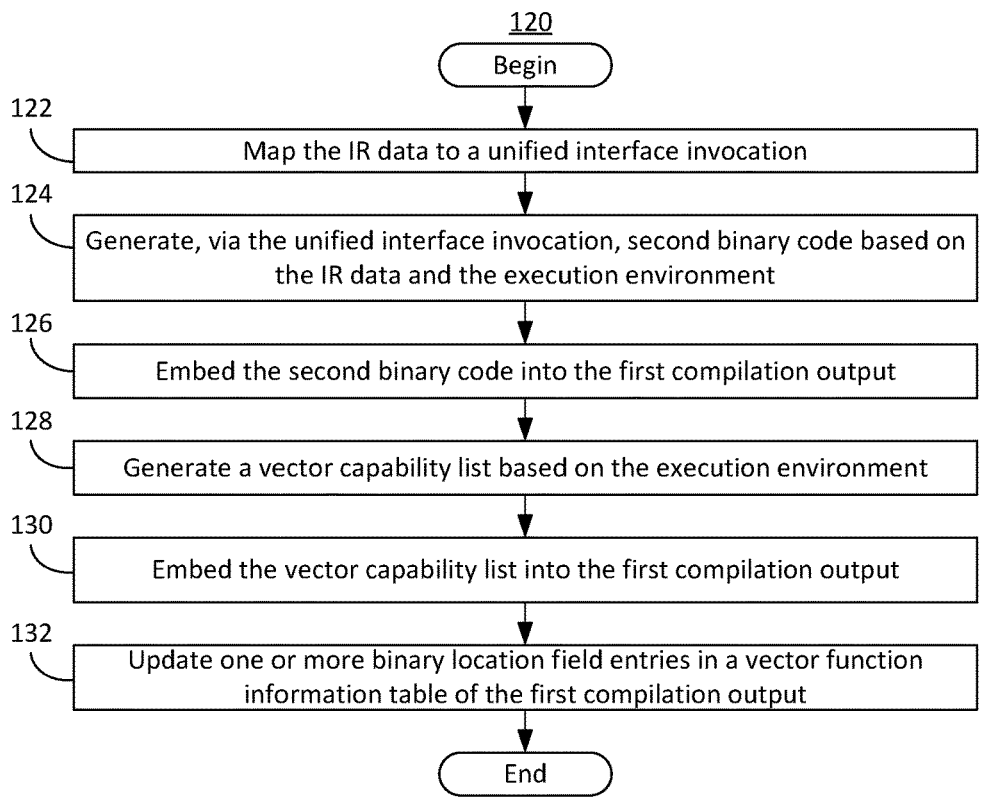
FIG. 6A is a flowchart of an example of a method of generating a first compilation output in a deployment stage according to an embodiment.

FIG. 6A shows a method 120 of generating a first compilation output in a deployment stage. The method 120 may readily be substituted for block 112 (FIG. 5), already discussed. More particularly, the method 120 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 122 provides for mapping IR data in an application binary file to a unified interface invocation such as, for example, a ONEAPI level 0 interface. In one example, block 124 generates, via the unified interface invocation, second binary code based on the IR data and the execution environment. Additionally, the second binary code may be embedded into a first compilation output at block 126. In an embodiment, block 128 generates a vector capability list based on the execution environment, wherein the vector capability list is embedded into the first compilation output at block 130. Moreover, illustrated block 132 provides for updating one or more binary location field entries in a vector function information table of the first compilation output.

Figure 6B:
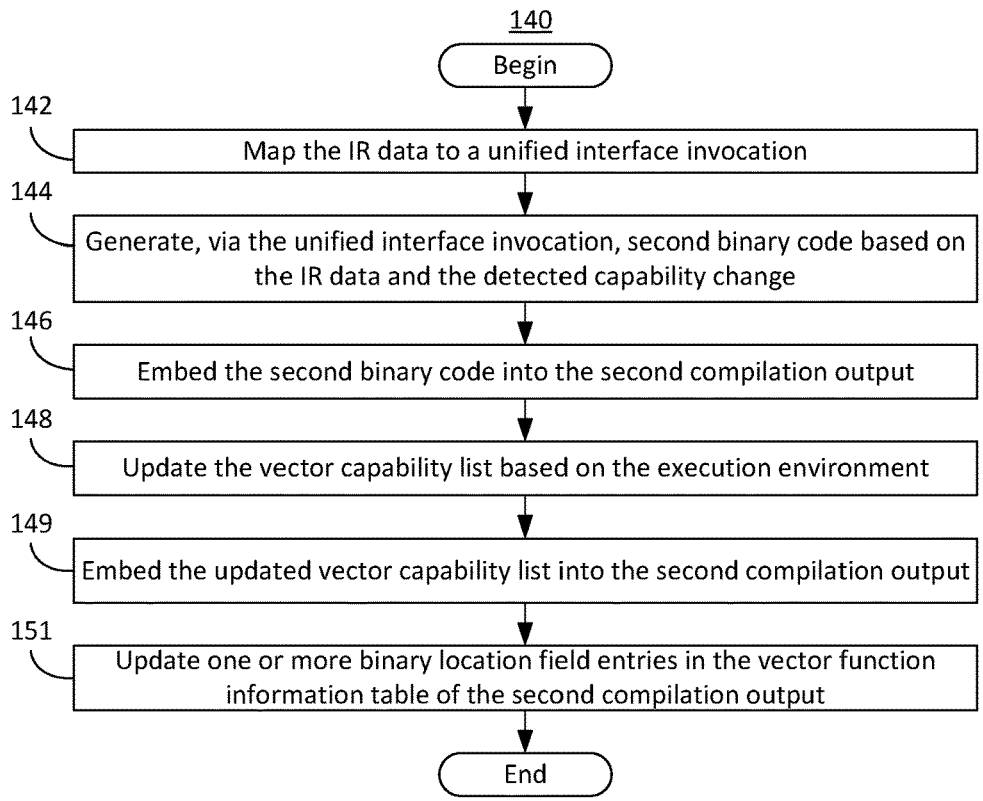
FIG. 6B is a flowchart of an example of a method of generating a second compilation output in a deployment stage according to an embodiment.

FIG. 6B shows a method 140 of generating a second compilation output in a deployment stage. The method 140 may readily be substituted for block 116 (FIG. 5), already discussed. More particularly, the method 140 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 142 provides for mapping IR data in an application binary file to a unified interface invocation such as, for example, a ONEAPI level 0 interface. In one example, block 144 generates, via the unified interface invocation, second binary code based on the IR data and a detected capability change. Additionally, the second binary code may be embedded into a second compilation output at block 146. In an embodiment, block 148 updates the vector capability list based on the execution environment, wherein the vector capability list is embedded into the second compilation output at block 149. Moreover, illustrated block 151 provides for updating one or more binary location field entries in a vector function information table of the second compilation output.

Figure 7:
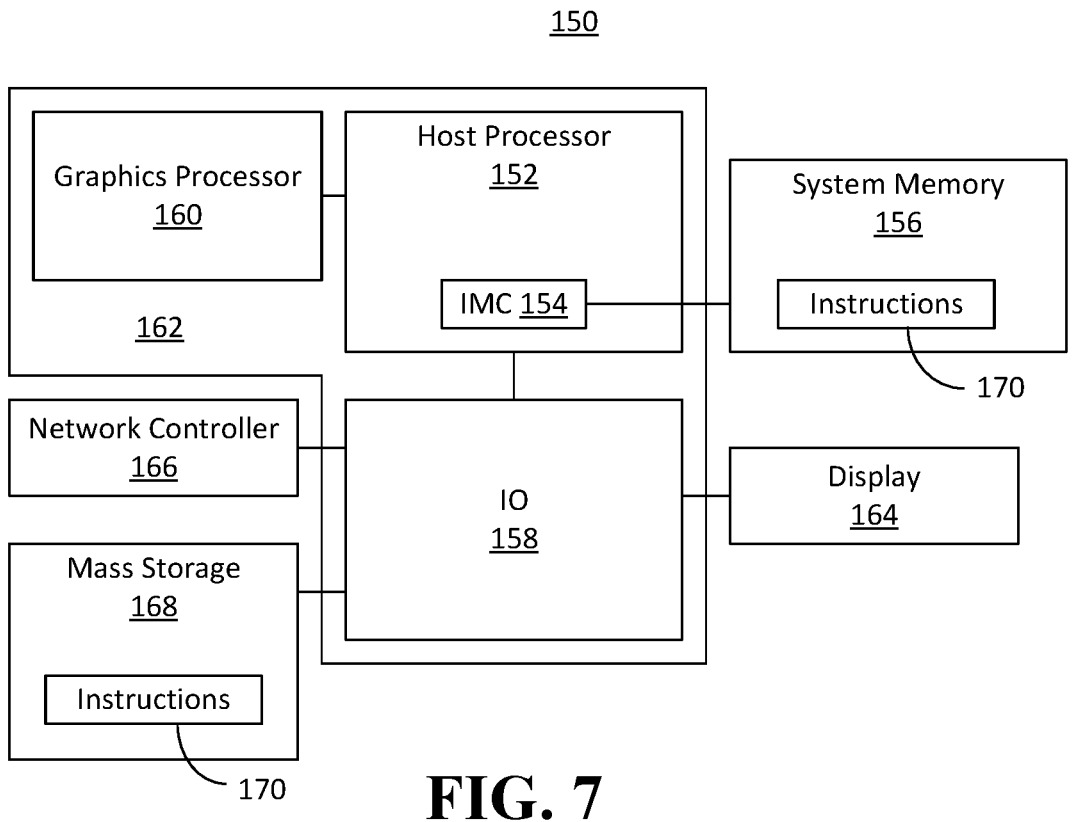
FIG. 7 is a block diagram of an example of a performance-enhanced computing system according to an embodiment.

Turning now to FIG. 7, a performance-enhanced computing system 150 is shown. The system 150 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), etc., or any combination thereof. In the illustrated example, the system 150 includes a host processor 152 (e.g., CPU) having an integrated memory controller (IMC) 154 that is coupled to a system memory 156.

The illustrated system 150 also includes an input output (IO) module 158 implemented together with the host processor 152 and a graphics processor 160 (e.g., GPU) on a semiconductor die 162 as a system on chip (SoC). The illustrated IO module 158 communicates with, for example, a display 164 (e.g., touch screen, liquid crystal display/LCD, light emitting diode/LED display), a network controller 166 (e.g., wired and/or wireless), and mass storage 168 (e.g., hard disk drive/HDD, optical disk, solid state drive/SSD, flash memory).

The host processor 152, the graphics processor 160 and/or the IO module 158 may execute instructions 170 retrieved from the system memory 156 and/or the mass storage 168. In an embodiment, the computing system 150 is operated in an application development stage and the instructions 170 include executable program instructions to perform one or more aspects of the method 90 (FIG. 4), already discussed. Thus, execution of the illustrated instructions 170 may cause the computing system 150 to embed binary code into an application binary file, wherein the binary code corresponds to vector functions and non-vector functions in statically typed source code. Execution of the instructions 170 may also cause the computing system 150 to generate IR data, wherein the IR data corresponds to the vector functions in the statically typed source code. In an embodiment, execution of the instructions 170 further cause the computing system 150 to embed the IR data into the application binary file. In one example, the application binary file is deployed via the network controller 166.

In another embodiment, the computing system 150 is operated in a deployment stage as an end user (e.g., client) computing system. In such a case, the network controller 166 may obtain (e.g., retrieve, request and/or receive via push and/or pull communications, etc.) an application binary file, wherein the application binary file includes first binary code corresponding to vector functions and non-vector functions and intermediate representation data corresponding to the vector functions. Moreover, the instructions 170 may include executable program instructions to perform one or more aspects of the method 110 (FIG. 5), the method 120 (FIG. 6A) and/or the method 140 (FIG. 6B), already discussed. Thus, when executed, the instructions 170 may cause the computing system 150 to generate a first compilation output based on the application binary file and detect a capability change in an execution environment associated with the first compilation output. The capability change might be a hardware and/or software change with respect to the semiconductor die 162. Execution of the instructions 170 may also cause the computing system 150 to generate, in response to the detected capability change, a second compilation output based on the first compilation output.

The system memory 156 and/or the mass storage 168 may therefore include a first memory section including binary code corresponding to vector functions and non-vector functions in statically typed source code and a second memory section including IR data corresponding to the vector functions in the statically typed source code. In an embodiment, the system memory 156 and/or the mass storage 168 may also include a third memory section including a vector function information table. In such a case, the vector function information table may include a type field, an IR location field, and a binary location field. In an embodiment, the binary field includes null data for one or more entries in the vector function information table upon deployment of the application binary file. As already noted, the IR data may correspond to a kernel function, a loop function, a SIMD function, a multi-processor directive function, a multi-processor pragma function, etc., or any combination thereof. In one example, the IR data includes compiler IRs and/or neural network tensor data.

Although the above discussion focuses on statically typed source code, the source code may also be dynamically typed source code having variable type data that is known only at runtime. In such a case, if a just-in-time (JIT) compiler of the code has crashed, been compromised or is otherwise unavailable, the technology described herein may be used to convert the source code into executable binary code.

The illustrated computing system 150 is therefore considered to be performance-enhanced at least to the extent that it enables the compilation output(s) to take advantage of subsequent upgrades to the execution environment. Indeed, eliminating the recompilation and redeployment process on the part of the application developer may lead to faster enablement of new software features by application developers and/or faster acceptance of system upgrades on the part of end users, as already noted.

Figure 8:
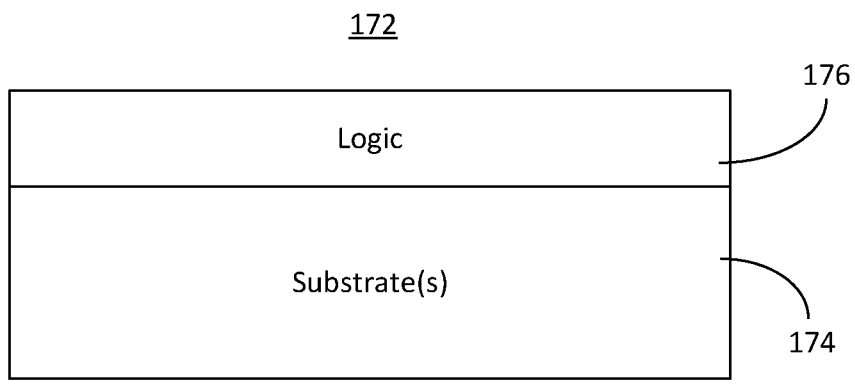
FIG. 8 is an illustration of an example of a semiconductor apparatus according to an embodiment.

FIG. 8 shows a semiconductor apparatus 172 (e.g., chip, die, package). The illustrated apparatus 172 includes one or more substrates 174 (e.g., silicon, sapphire, gallium arsenide) and logic 176 (e.g., transistor array and other integrated circuit/IC components) coupled to the substrate(s) 174. In an embodiment, the apparatus 172 is operated in an application development stage and the logic 176 performs one or more aspects of the method 90 (FIG. 4), already discussed. Thus, the logic 176 may embed binary code into an application binary file, wherein the binary code corresponds to vector functions and non-vector functions in statically typed source code. The logic 176 may also generate IR data, wherein the IR data corresponds to the vector functions in the statically typed source code. In an embodiment, the logic 176 further embeds the IR data into the application binary file.

In another embodiment, the apparatus 172 is operated in a deployment stage and the logic performs one or more aspects of the method 110 (FIG. 5), the method 120 (FIG.

6A) and/or the method 140 (FIG. 6B), already discussed. In such a case, the logic 176 may generate a first compilation output based on an application binary file, wherein the application binary file includes first binary code corresponding to vector functions and non-vector functions and intermediate representation data corresponding to the vector functions. Additionally, the logic 176 may detect a capability change in an execution environment associated with the first compilation output. The capability change might be a hardware and/or software change. In an embodiment, the logic 176 generates, in response to the detected capability change, a second compilation output based on the first compilation output.

The illustrated apparatus 172 is therefore considered to be performance-enhanced at least to the extent that it enables the compilation output(s) to automatically take advantage of subsequent upgrades to the execution environment. Indeed, eliminating the recompilation and redeployment process on the part of the application developer may lead to faster enablement of new software features by application developers and/or faster acceptance of system upgrades on the part of end users, as already noted.

The logic 176 may be implemented at least partly in configurable logic or fixed-functionality hardware logic. In one example, the logic 176 includes transistor channel regions that are positioned (e.g., embedded) within the substrate(s) 174. Thus, the interface between the logic 176 and the substrate(s) 174 may not be an abrupt junction. The logic 176 may also be considered to include an epitaxial layer that is grown on an initial wafer of the substrate(s) 174.

Figure 9:
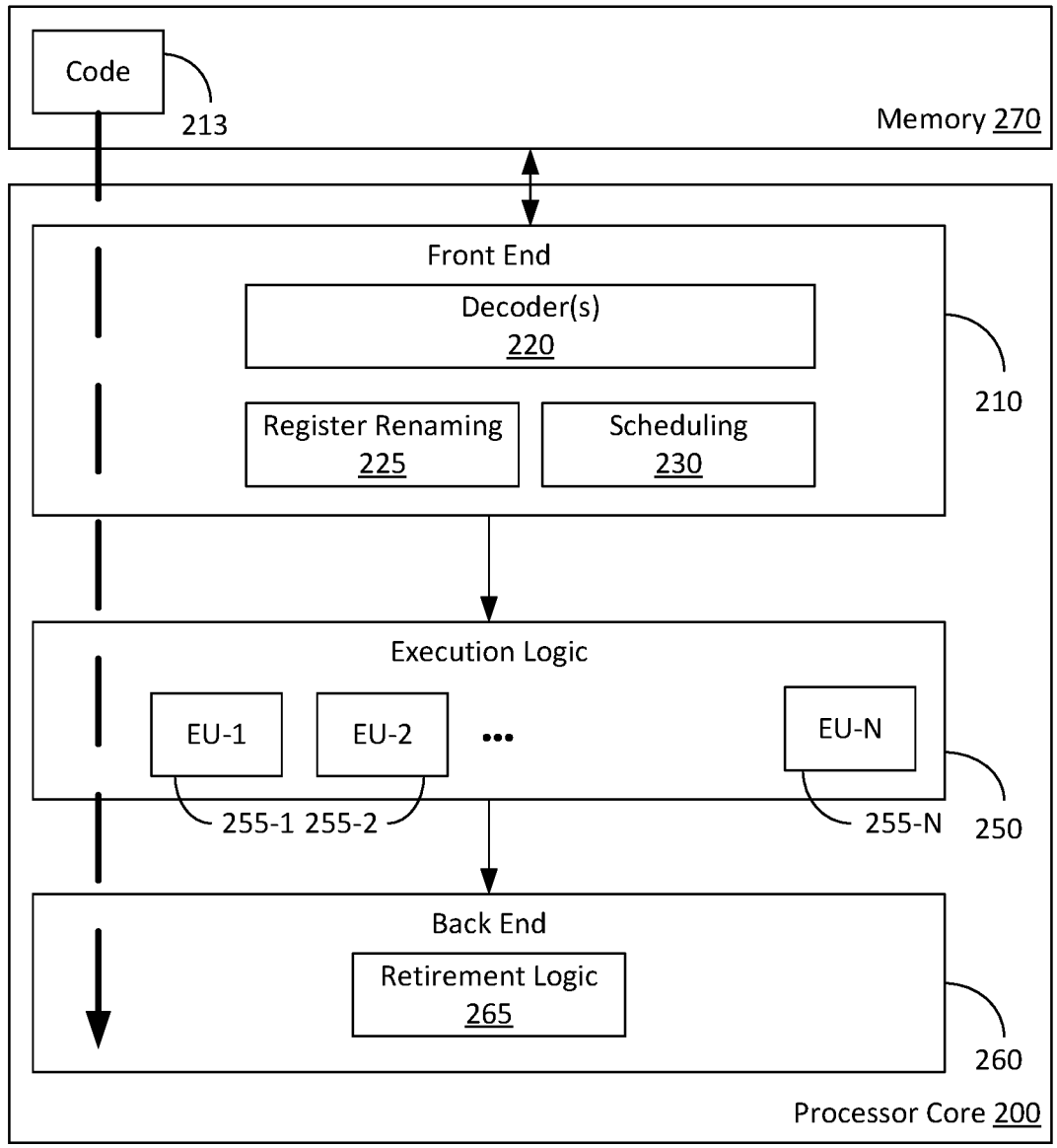
FIG. 9 is a block diagram of an example of a processor according to an embodiment.

FIG. 9 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 9, a processing element may alternatively include more than one of the processor core 200 illustrated in FIG. 9. The processor core 200 may be a single-threaded core or, for at least one embodiment, the processor core 200 may be multithreaded in that it may include more than one hardware thread context (or "logical processor") per core.

FIG. 9 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 90 (FIG. 4), the method 110 (FIG. 5), the method 120 (FIG. 6A) and/or the method 140 (FIG. 6B), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 9, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 10, shown is a block diagram of a computing system 1000 embodiment in accordance with an embodiment. Shown in FIG. 10 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 10 may be implemented as a multi-drop bus rather than point-to-point interconnect.

As shown in FIG. 10, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 9.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 10, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 10, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 10, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 90 (FIG. 4), the method 110 (FIG. 5), the method 120 (FIG. 6A) and/or the method 140 (FIG. 6B), already discussed, and may be similar to the code 213 (FIG. 9), already discussed. Further, an audio I/O 1024 may be coupled to second bus 1020 and a battery 1010 may supply power to the computing system 1000.

Note that other embodiments are contemplated. For example, instead of the point-to-point architecture of FIG. 10, a system may implement a multi-drop bus or another such communication topology. Also, the elements of FIG. 10 may alternatively be partitioned using more or fewer integrated chips than shown in FIG. 10.

ADDITIONAL NOTES AND EXAMPLES

Example 1 includes a performance-enhanced computing system comprising a network controller to obtain an application binary file, wherein the application binary file includes first binary code corresponding to vector functions and non-vector functions and intermediate representation data corresponding to the vector functions, a processor coupled to the network controller, and a memory including a set of executable program instructions, which when executed by the processor, cause the computing system to generate a first compilation output based on the application binary file, detect a capability change in an execution environment associated with the first compilation output, and generate, in response to the detected capability change, a second compilation output based on the first compilation output.

Example 2 includes the computing system of Example 1, wherein to generate the second compilation output, the instructions, when executed, further cause the computing system to map the intermediate representation data to a unified interface invocation, generate, via the unified interface invocation, second binary code based on the intermediate representation data and the detected capability change, and embed the second binary code into the second compilation output.

Example 3 includes the computing system of Example 1, wherein to generate the first compilation output, the instructions, when executed, further cause the computing system to map the intermediate representation data to a unified interface invocation, generate, via the unified interface invocation, second binary code based on the intermediate representation data and the execution environment, and embed the second binary code into the first compilation output.

Example 4 includes the computing system of Example 1, wherein the instructions, when executed, further cause the computing system to generate a vector capability list based on the execution environment, embed the vector capability into the first compilation output, wherein the capability change is detected based on the vector capability list, update the vector capability list based on the execution environment, and embed the updated vector capability list into the second compilation output.

Example 5 includes the computing system of Example 1, wherein the application binary file further includes a vector function information table, and wherein to generate the first compilation output, the instructions, when executed, further cause the computing system to update one or more binary location field entries in the vector function information table.

Example 6 includes the computing system of any one of Examples 1 to 5, wherein the capability change is one or more of a hardware change or a software change.

Example 7 includes at least one computer readable storage medium comprising a set of executable program instructions, which when executed by a computing system, cause the computing system to generate a first compilation output based on an application binary file, wherein the application binary file includes first binary code corresponding to vector functions and non-vector functions and intermediate representation data corresponding to the vector functions, detect a capability change in an execution environment associated with the first compilation output, and generate, in response to the detected capability change, a second compilation output based on the first compilation output.

Example 8 includes the at least one computer readable storage medium of Example 7, wherein to generate the second compilation output, the instructions, when executed, further cause the computing system to map the intermediate representation data to a unified interface invocation, generate, via the unified interface invocation, second binary code based on the intermediate representation data and the detected capability change, and embed the second binary code into the second compilation output.

Example 9 includes the at least one computer readable storage medium of Example 7, wherein to generate the first compilation output, the instructions, when executed, further cause the computing system to map the intermediate representation data to a unified interface invocation, generate, via the unified interface invocation, second binary code based on the intermediate representation data and the execution environment, and embed the second binary code into the first compilation output.

Example 10 includes the at least one computer readable storage medium of Example 7, wherein the instructions, when executed, further cause the computing system to generate a vector capability list based on the execution environment, embed the vector capability into the first compilation output, wherein the capability change is detected based on the vector capability list, update the vector capability list based on the execution environment, and embed the updated vector capability list into the second compilation output.

Example 11 includes the at least one computer readable storage medium of Example 7, wherein the application binary file further includes a vector function information table, and wherein to generate the first compilation output, the instructions, when executed, further cause the computing system to update one or more binary location field entries in the vector function information table.

Example 12 includes the at least one computer readable storage medium of any one of Examples 7 to 11, wherein the capability change is one or more of a hardware change or a software change.

Example 13 includes a method of operating a performance-enhanced computing system, the method comprising generating a first compilation output based on an application binary file, wherein the application binary file includes first binary code corresponding to vector functions and non-vector functions and intermediate representation data corresponding to the vector functions, detecting a capability change in an execution environment associated with the first compilation output, and generating, in response to the detected capability change, a second compilation output based on the first compilation output.

Example 14 includes the method of Example 13, wherein to generate the second compilation output, the instructions, when executed, further cause the computing system to mapping the intermediate representation data to a unified interface invocation, generating, via the unified interface invocation, second binary code based on the intermediate representation data and the detected capability change, and embedding the second binary code into the second compilation output.

Example 15 includes the method of Example 13, wherein generating the first compilation output includes mapping the intermediate representation data to a unified interface invocation, generating, via the unified interface invocation, second binary code based on the intermediate representation data and the execution environment, and embedding the second binary code into the first compilation output.

Example 16 includes the method of Example 13, further including generating a vector capability list based on the execution environment, embedding the vector capability into the first compilation output, wherein the capability change is detected based on the vector capability list, updating the vector capability list based on the execution environment, and embed the updated vector capability list into the second compilation output.

Example 17 includes the method of Example 13, wherein the application binary file further includes a vector function information table, and wherein generating the first compilation output further includes updating one or more binary location field entries in the vector function information table.

Example 18 includes the method of any one of Examples 13 to 17, wherein the capability change is one or more of a hardware change or a software change.

Example 19 includes at least one computer readable storage medium comprising a first memory section including binary code corresponding to vector functions and non-vector functions in statically typed source code, and a second memory section including intermediate representation data corresponding to the vector functions in the statically typed source code.

Example 20 includes the at least one computer readable storage medium of Example 19, further including a third memory section including a vector function information table.

Example 21 includes the at least one computer readable storage medium of Example 20, wherein the vector function information table includes a type field, an intermediate representation location field, and a binary location field.

Example 22 includes the at least one computer readable storage medium of Example 21, wherein the binary location field includes null data for one or more entries in the vector function information table.

Example 23 includes the at least one computer readable storage medium of Example 19, wherein the intermediate representation data corresponds to one or more of a kernel function, a loop function, a single instruction multiple data (SIMD) function, a multi-processor directive function or a multi-processor pragma function.

Example 24 includes the at least one computer readable storage medium of any one of Examples 19 to 23, wherein the intermediate representation data includes one or more of compiler intermediate representations or neural network tensor data.

Example 25 includes at least one computer readable storage medium comprising a set of executable program instructions, which when executed by a computing system, cause the computing system to embed binary code into an application binary file, wherein the binary code corresponds to vector functions and non-vector functions in statically typed source code, generate intermediate representation data, wherein the intermediate representation data corresponds to the vector functions in the statically typed source code, and embed the intermediate representation data into the application binary file.

Example 26 includes the at least one computer readable storage medium of Example 25, wherein the instructions, when executed, further cause the computing system to generate a vector function information table, and embed the vector function information table into the application binary file.

Example 27 includes the at least one computer readable storage medium of Example 26, wherein the vector function information table includes a type field, an intermediate representation location field, and a binary location field.

Example 28 includes the at least one computer readable storage medium of Example 27, wherein the binary location field includes null data for one or more entries in the vector function information table.

Example 29 includes the at least one computer readable storage medium of Example 25, wherein the vector functions include one or more of a kernel function, a loop function, a single instruction multiple data (SIMD) function, a multi-processor directive function or a multi-processor pragma function.

Example 30 includes the at least one computer readable storage medium of any one of Examples 25 to 29, wherein the intermediate representation data includes one or more of compiler intermediate representations or neural network tensor data.

Example 31 includes a method of operating a performance-enhanced computing system, the method comprising embedding binary code into an application binary file, wherein the binary code corresponds to vector functions and non-vector functions in statically typed source code, generating intermediate representation data, wherein the intermediate representation data corresponds to the vector functions in the statically typed source code, and embedding the intermediate representation data into the application binary file.

Example 32 includes the method of Example 31, further comprising generating a vector function information table, and embedding the vector function information table into the application binary file.

Example 33 includes the method of Example 32, wherein the vector function information table includes a type field, an intermediate representation location field, and a binary location field.

Example 34 includes the method of Example 33, wherein the binary location field includes null data for one or more entries in the vector function information table.

Example 35 includes the method of Example 31, wherein the vector functions include one or more of a kernel function, a loop function, a single instruction multiple data (SIMD) function, a multi-processor directive function or a multi-processor pragma function.

Example 36 includes the method of any one of Examples 31 to 35, wherein the intermediate representation data includes one or more of compiler intermediate representations or neural network tensor data.

Example 37 includes a performance-enhanced computing system comprising a network controller, a processor coupled to the network controller, and a memory coupled to the processor, the memory including a set of executable program instructions, which when executed by the processor, cause the computing system to perform the method of any one of Examples 31 to 36.

Example 38 includes means for performing the method of any one of Examples 31 to 36.

Example 39 includes means for performing the method of any one of Examples 13 to 18.

Thus, technology described herein may provide for a unified and commonly shared way to enable and adapt standalone vector related computations in all software as one single batch. Additionally, the technology may provide a multi-stage solution for static languages such as C, C++ and/or Rust, with the application being distributed as a hybrid of a final binary along with intermediate representations of vector functions. The subsequent stage compilation is automatically adapted and specialized to various hardware by interacting with an interface such as, for example, the ONEAPI X0 Interface. Moreover, the second stage compilation may be triggered at the loading phase and could be triggered multiple times as needed. Such an approach may be useful in auto-enabling and auto-adapting every impacted application upon any hardware or software runtime change.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A performance-enhanced computing system comprising:
   a network controller to obtain an application binary file, wherein the application binary file includes first binary code corresponding to vector functions and non-vector functions and intermediate representation data corresponding to the vector functions, and wherein the application binary file further includes a vector function information table;
a processor coupled to the network controller; and
a memory including a set of executable program instructions, which when executed by the processor, cause the computing system to:
generate a first compilation output based on the application binary file;
detect a capability change in an execution environment associated with the first compilation output; and
generate, in response to the detected capability change, a second compilation output based on the first compilation output;
wherein to generate the second compilation output, the instructions, when executed, further cause the computing system to:
map the intermediate representation data to a unified interface invocation;
generate, via the unified interface invocation, second binary code based on the intermediate representation data and the detected capability change;
embed the second binary code into the second compilation output;
update the vector capability list based on the execution environment;
embed the updated vector capability list into the second compilation output; and
update one or more binary location field entries in the vector function information table.

2. The computing system of claim 1, wherein to generate the first compilation output, the instructions, when executed, further cause the computing system to:
map the intermediate representation data to the unified interface invocation;
generate, via the unified interface invocation, third binary code based on the intermediate representation data and the execution environment; and
embed the third binary code into the first compilation output.

3. The computing system of claim 1, wherein the instructions, when executed, further cause the computing system to:
generate a vector capability list based on the execution environment; and
embed the vector capability list into the first compilation output, wherein the capability change is detected based on the vector capability list.

4. The computing system of claim 1, wherein to generate the first compilation output, the instructions, when executed, further cause the computing system to update one or more binary location field entries in the vector function information table.

5. The computing system of claim 1, wherein the capability change is one or more of a hardware change or a software change.

6. At least one non-transitory computer readable storage medium comprising a set of executable program instructions, which when executed by a computing system, cause the computing system to:
generate a first compilation output based on an application binary file, wherein the application binary file includes first binary code corresponding to vector functions and non-vector functions and intermediate representation data corresponding to the vector functions, and wherein the application binary file further includes a vector function information table;
detect a capability change in an execution environment associated with the first compilation output; and
generate, in response to the detected capability change, a second compilation output based on the first compilation output;
wherein to generate the second compilation output, the instructions, when executed, further cause the computing system to:
map the intermediate representation data to a unified interface invocation;
generate, via the unified interface invocation, second binary code based on the intermediate representation data and the detected capability change;
embed the second binary code into the second compilation output;
update the vector capability list based on the execution environment;
embed the updated vector capability list into the second compilation output; and
update one or more binary location field entries in the vector function information table.

7. The at least one non-transitory computer readable storage medium of claim 6, wherein to generate the first compilation output, the instructions, when executed, further cause the computing system to:
map the intermediate representation data to the unified interface invocation;
generate, via the unified interface invocation, third binary code based on the intermediate representation data and the execution environment; and
embed the third binary code into the first compilation output.

8. The at least one non-transitory computer readable storage medium of claim 6, wherein the instructions, when executed, further cause the computing system to:
generate a vector capability list based on the execution environment; and
embed the vector capability list into the first compilation output, wherein the capability change is detected based on the vector capability list.

9. The at least one non-transitory computer readable storage medium of claim 6, wherein to generate the first compilation output, the instructions, when executed, further cause the computing system to update one or more binary location field entries in the vector function information table.

10. The at least one non-transitory computer readable storage medium of claim 6, wherein the capability change is one or more of a hardware change or a software change.

11. A method of operating a performance-enhanced computing system, the method comprising:
generating a first compilation output based on an application binary file, wherein the application binary file includes first binary code corresponding to vector functions and non-vector functions and intermediate representation data corresponding to the vector functions, and wherein the application binary file further includes a vector function information table;
detecting a capability change in an execution environment associated with the first compilation output; and
generating, in response to the detected capability change, a second compilation output based on the first compilation output;

wherein generating the second compilation output includes:
mapping the intermediate representation data to a unified interface invocation;
generating, via the unified interface invocation, second binary code based on the intermediate representation data and the detected capability change;
embedding the second binary code into the second compilation output;
updating the vector capability list based on the execution environment;
embedding the updated vector capability list into the second compilation output; and
updating one or more binary location field entries in the vector function information table.

12. The method of claim 11, wherein generating the first compilation output includes:
mapping the intermediate representation data to the unified interface invocation;
generating, via the unified interface invocation, third binary code based on the intermediate representation data and the execution environment; and
embedding the third binary code into the first compilation output.

13. The method of claim 11, further comprising:
generating a vector capability list based on the execution environment; and
embedding the vector capability list into the first compilation output, wherein the capability change is detected based on the vector capability list.

14. The method of claim 11, wherein generating the first compilation output further includes updating one or more binary location field entries in the vector function information table.

15. The method of claim 11, wherein the capability change is one or more of a hardware change or a software change.

* * * * *